(12) United States Patent
Byrd et al.

(10) Patent No.: US 8,932,464 B2
(45) Date of Patent: Jan. 13, 2015

(54) STATIC DISSIPATER FOR A FUEL FILTER ASSEMBLY

(75) Inventors: Timothy A. Byrd, West End, NC (US); L. Steven Cline, Fayetteville, NC (US)

(73) Assignee: MANN+HUMMEL Purolator Filters LLC, Fayetteville, NC (US)

( * ) Notice: Subject to any disclaimer, the term of this patent is extended or adjusted under 35 U.S.C. 154(b) by 276 days.

(21) Appl. No.: 13/425,593

(22) Filed: Mar. 21, 2012

(65) Prior Publication Data

US 2013/0248435 A1 Sep. 26, 2013

(51) Int. Cl.
- *F02M 37/22* (2006.01)
- *B01D 29/15* (2006.01)
- *B01D 35/14* (2006.01)
- *B01D 29/58* (2006.01)

(52) U.S. Cl.
USPC .............. 210/243; 210/172.1; 210/172.3; 210/416.4; 210/435; 210/437; 210/256; 210/258; 210/315

(58) Field of Classification Search
None
See application file for complete search history.

(56) References Cited

U.S. PATENT DOCUMENTS

| | | |
|---|---|---|
| 5,783,076 A | 7/1998 | Albers, Jr. |
| 5,832,589 A | 11/1998 | Mercer et al. |
| 6,171,492 B1 | 1/2001 | Hedgepeth et al. |
| 6,358,022 B1 * | 3/2002 | Frank et al. ............... 417/423.9 |
| 2009/0038748 A1 | 2/2009 | Desmarais |
| 2010/0025318 A1 * | 2/2010 | Berland et al. ............... 210/243 |

* cited by examiner

*Primary Examiner* — Benjamin Kurtz
(74) *Attorney, Agent, or Firm* — Crowell & Moring LLP

(57) ABSTRACT

Static dissipaters for eliminating static electricity in fuel filter assemblies and fuel filter assemblies including static dissipaters are provided. The static dissipaters are in the form of a static dissipation sleeve that is disposed around the outside of a fuel pump within a fuel filter assembly. The static dissipation sleeve has one or more protrusion portions that protrude radially from the surface of the static dissipation sleeve and provide contacts for static dissipation of static electricity.

12 Claims, 4 Drawing Sheets

STATIC DISSIPATER FOR A FUEL FILTER ASSEMBLY

BACKGROUND OF THE INVENTION

Virtually all devices that consume liquid fuel include a fuel filter. The most common example of a liquid fuel filter is that used on automobile and truck engines. Fuel filters have always been important as a part of internal combustion engines since any dirt or contamination in fuel can easily cause carburetor problems or, in newer engines, fuel injector problems. Most manufacturers of internal combustion engines recommend periodic replacement of fuel filters to make certain that they do not become clogged and impair engine performance and to be certain that filtration of the fuel is effective to remove solids and other contaminants.

When fuel filters were first marketed for internal combustion engines, they were typically in the form of a permanently mounted housing that could be disassembled and the filter element itself being replaced. In recent years, substantially all manufacturers of internal combustion engines, and particularly manufacturers of cars and trucks, employ disposable filters in which the housings that contain the filter elements are integral and are not subject to being disassembled. That is, when it is necessary to replace a fuel filter, the entire filter housing is thrown away.

A problem that has long been known to the designers of fuel systems for automobile and truck engines is that fuel flowing through a filter can result in the accumulation of static electricity. As fuel passes through a filter media, the flowing fuel is stripped of electrons with the electrons collecting on the inside of the filter housing. If the fuel filter housing is metal, this electrical charge is readily conducted away, but when the housing is made of a non-conductive material, such as plastic, the charge is not readily conducted away and thus a buildup of electrostatic charge can occur to the point where a static discharge can take place. When an electrostatic charge builds up in a filter that exceeds the dielectric strength of the material of which the filter body is formed, a discharge can occur between the filter housing and an adjacent conductive part of the engine with which the filter is employed. Discharge through a plastic filter housing can cause a pinhole in the housing and leakage of fuel can occur.

SUMMARY OF THE INVENTION

The present invention relates to a static dissipation sleeve and a fuel filter assembly having a static dissipation sleeve for eliminating static electricity in the fuel filter assembly.

A fuel filter assembly according to an embodiment of the present invention includes a housing, a fuel pump, a filter element assembly disposed outside of the fuel pump and including a filter medium for filtering fuel, a static dissipation sleeve disposed outside of the fuel pump and in contact with an outer surface of the fuel pump, and a water separation tube disposed between the static dissipation sleeve and the filter medium, wherein the static dissipation sleeve includes a protrusion portion that projects radially outward and contacts the water separation tube. This and other embodiments of fuel filter assemblies and static dissipation sleeves are further described below.

According to the present invention, an improved structure for static dissipation is provided that allows for a variety of contact points for static dissipation.

Other objects, advantages, and novel features of the present invention will become apparent from the following detailed description of the invention when considered in conjunction with the accompanying drawings.

DETAILED DESCRIPTION OF THE DRAWINGS

Figure 1:
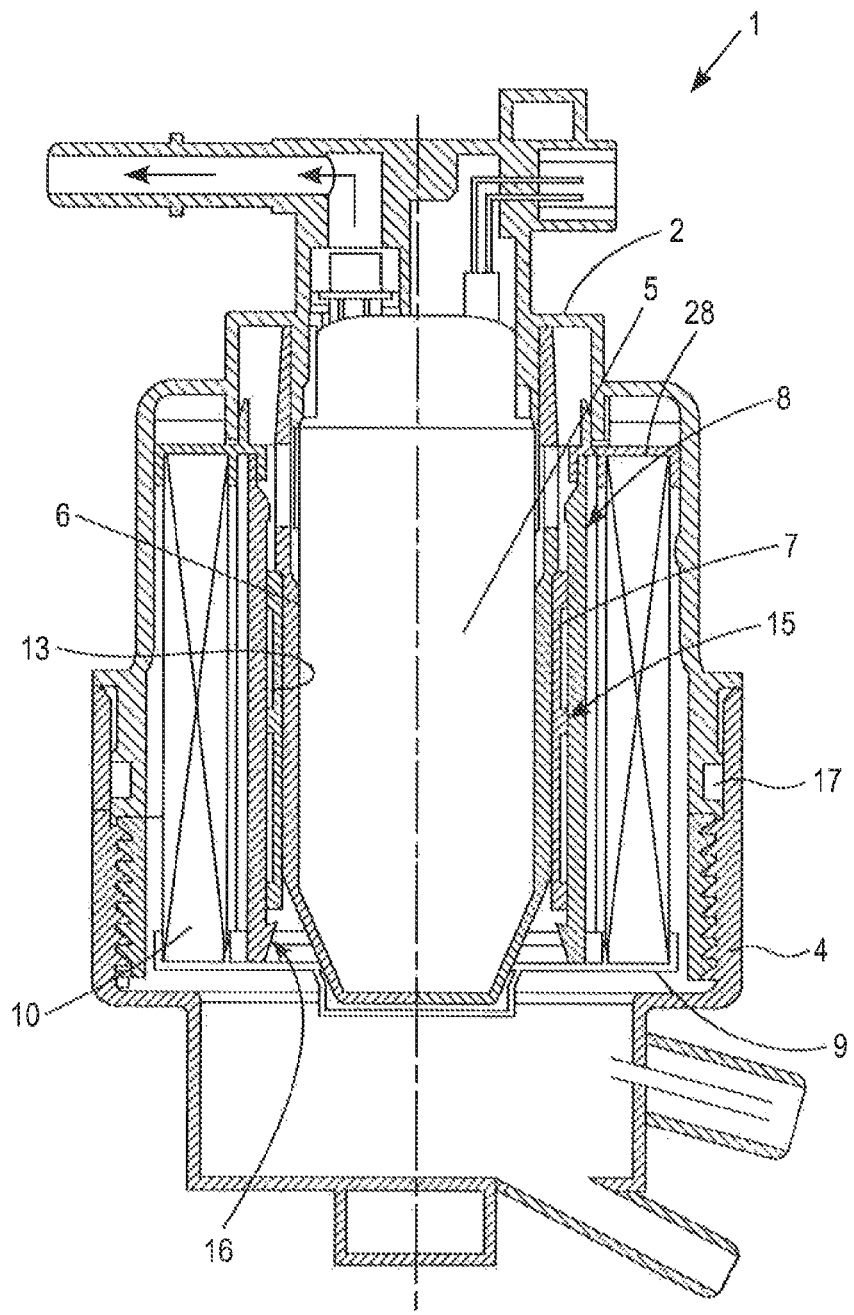
FIG. 1 illustrates an exemplary embodiment of a fuel filter assembly in accordance with the present invention.

FIG. 1 illustrates an exemplary embodiment of a fuel filter assembly according to the present invention. In this embodiment, a static dissipation sleeve 7 is disposed in a fuel filter assembly 1 to provide static dissipation by limiting the amount of static electricity that can build up in the fuel filter assembly 1. The static dissipation sleeve 7 may be made of PA66, for example, or any other suitable material that provides for static dissipation. The fuel filter assembly 1 is encased in a housing that includes an upper housing 2 and a lower housing 4. In this embodiment, the upper and lower housings are connected to each other via threaded engagement and sealed by an O-ring 17 disposed between them; however, any suitable connection may be used. Within the housing of the fuel filter assembly 1 is a filter element assembly 9, which includes a filter medium 10 for filtering the fuel in the fuel filter assembly 1.

The static dissipation sleeve 7 is disposed outside of, but in contact with, a cover 6 of a fuel pump 5. In order to provide static dissipation for the fuel pump 5, the inner surface of the static dissipation sleeve 7 includes one or more contact points 13 that provide a path for static dissipation from the cover 6 of the fuel pump 5 to the static dissipation sleeve 7.

As shown in FIG. 1, the static dissipation sleeve 7 includes one or more protrusion portions 15 that protrude radially outward toward a water separation tube 8 that may include a mesh layer. Although three protrusion portions are illustrated, the present invention is not limited to this number, as it is simply an example. In one exemplary embodiment of the invention, the protrusion portion is an annular ring disposed around the periphery of the static dissipation sleeve. The protrusion portions 15 may have a variety of shapes, including, for example, an o-ring that covers the entire circumference of the static dissipation sleeve 7 or discrete projections that do not cover the entire circumference. The water separation tube 8, which provides water separation for the fuel filter assembly 1 to guide away any water that accumulates in the fuel filter assembly, may be in the form of a sleeve.

The protrusion portions 15 provide contact points on the inner surface of the water separation tube 8 for static dissipation from the fuel pump 5. The water separation tube 8 may also include a plurality of pull-off barbs 16 disposed on the inner surface of the water separation tube 8 at each end. These barbs 16 can act as movement limiters for the static dissipation sleeve 7 to retain the static dissipation sleeve 7 in its installed position. The number of pull-off barbs may vary depending upon the particular implementation.

Figure 2:
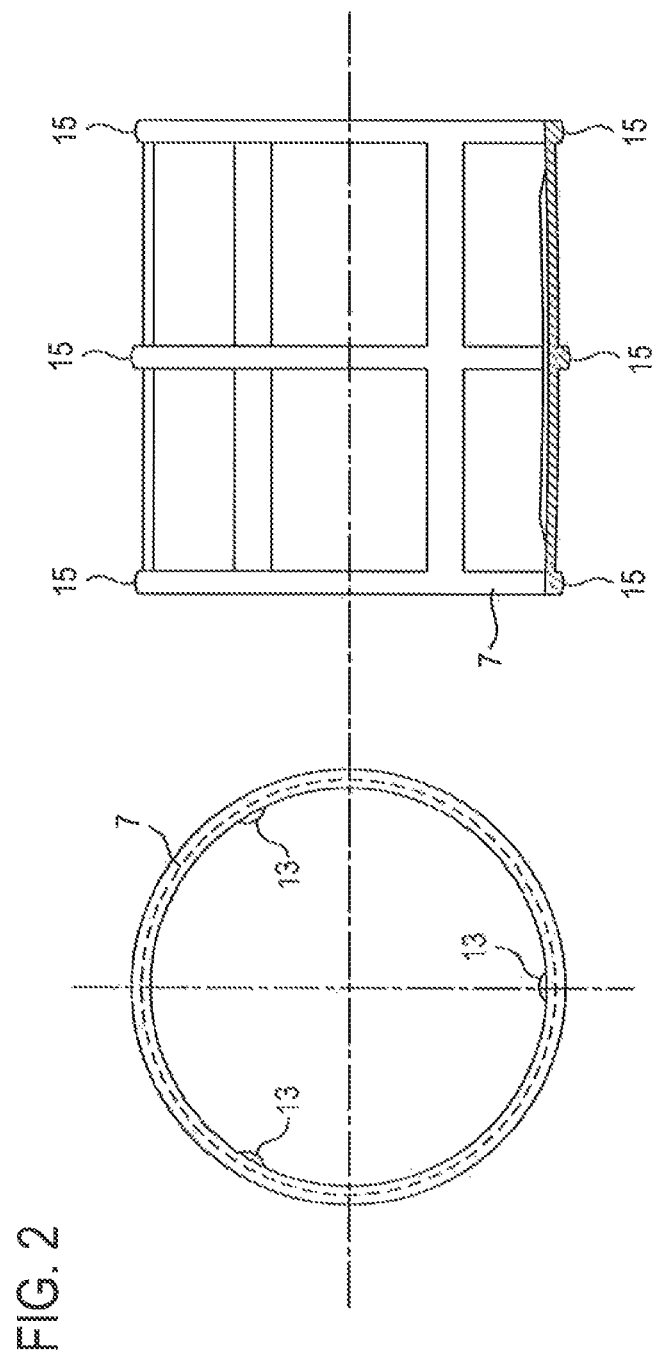
FIG. 2 illustrates an exemplary embodiment of a static dissipation sleeve in accordance with the fuel filter assembly of FIG. 1.

FIG. 2 illustrates side and end views of the static dissipation sleeve of the fuel filter assembly of FIG. 1. As shown in the end view of FIG. 2, the inner surface of the static dissipation sleeve 7 includes a plurality of contact points 13 for making contact with the cover 6 of the fuel pump 5 of FIG. 1. The figure illustrates three contact points, but this number of contact points is merely an example. Any other number of contacts points may be used. In one exemplary embodiment of the invention, the contact points 13 include an annular ring disposed around the inner surface of the static dissipation sleeve 7.

The side view of the static dissipation sleeve 7 illustrates the protrusion portions 15 on the outer surface of the static dissipation sleeve 7, which provide static dissipation contacts to the water separation tube 8 of FIG. 1. As shown in the side view, the static dissipation sleeve 7 may be configured to have a lattice structure with any number of vertical and horizontal elements. Other suitable structures may also be used for the static dissipation sleeve 7.

Figure 3:
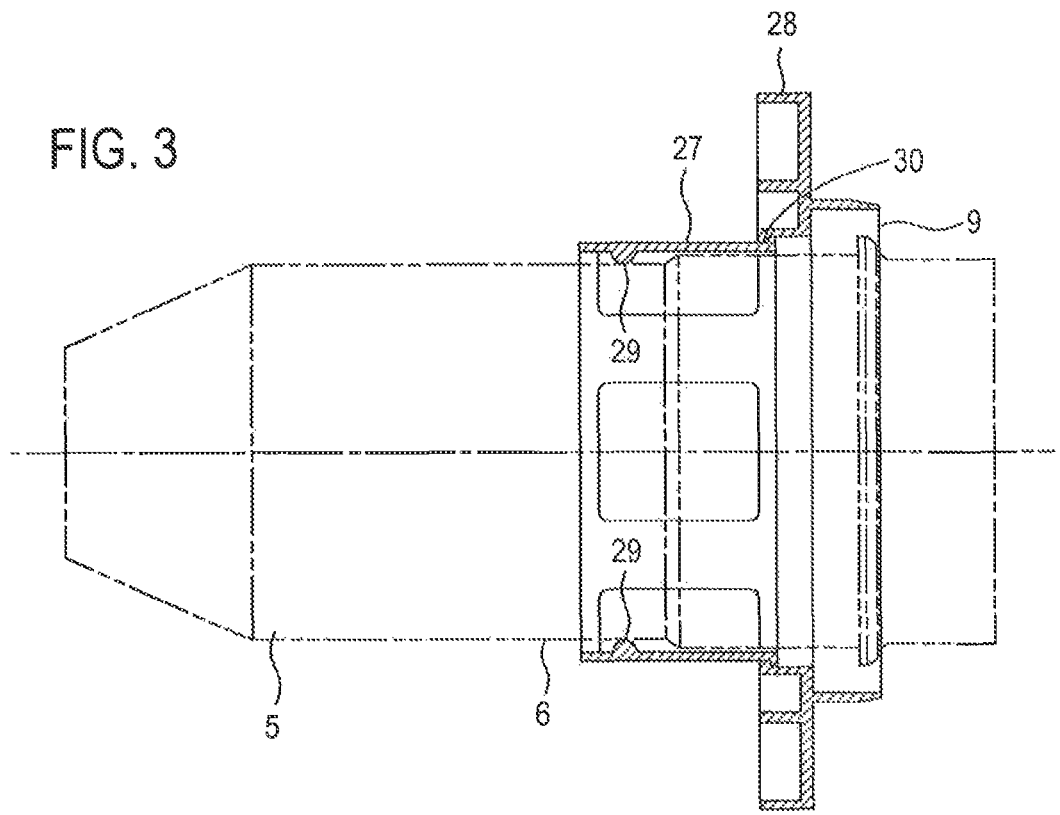
FIG. 3 illustrates another exemplary embodiment of a static dissipation sleeve according to the present invention.

FIG. 3 illustrates another exemplary embodiment of a static dissipation sleeve according to the present invention. As illustrated in FIG. 3, the static dissipation sleeve 27 is attached to an end cap 28 of a filter element assembly 9 in an attachment area 30 prior to insertion into a fuel filter assembly. The static dissipation sleeve 27 may be attached to the end cap 28 by a welded connection. For example, the welded connection may be made by an ultrasonic weld. However, any other suitable connection may be used.

The static dissipation sleeve 27 includes one or more protrusion portions 29 on the inner surface thereof for contacting the cover 6 of the fuel pump 5 to provide static dissipation for the fuel pump 5. As illustrated in FIG. 3, the protrusion portions 29 project radially inward from the inner surface of the static dissipation sleeve 27 toward the pump cover 6. Although the protrusion portions 29 shown in FIG. 3 are disposed near the end of the static dissipation sleeve 27 that is opposite to the welded end of the static dissipation sleeve 27, the protrusion portions 29 may be located in other portions of the static dissipation sleeve 27.

As an alternative to the welded connection in the attachment area 30, the static dissipation sleeve 27 may be attached to the end cap 28 by an electrically conductive adhesive. A variety of adhesives may be used as long as they include an electrically conductive component for static dissipation and are suitable for the environment of the fuel filters contemplated by this invention.

Figure 4:
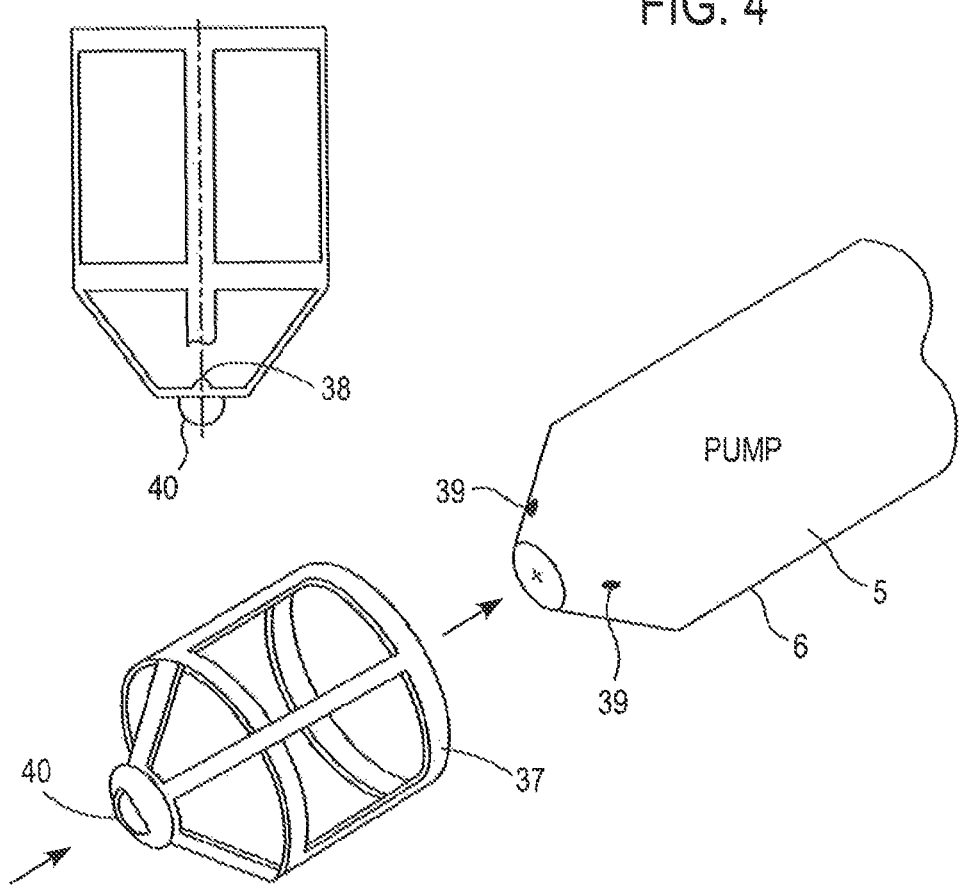
FIG. 4 illustrates an additional exemplary embodiment of a static dissipation sleeve according to the present invention.

FIG. 4 illustrates an additional exemplary embodiment of a static dissipation sleeve according to the present invention. As illustrated in FIG. 4, a static dissipation sleeve 37 is configured to slide onto a lower end of a fuel pump 5. The inner surface of the static dissipation sleeve 37 is in contact with the outer surface of the cover 6 of the fuel pump 5 for static dissipation. The static dissipation sleeve 37 includes a stand-off bump 38 which contacts the bottom end of the cover 6 of the fuel pump 5 to create a space between the static dissipation sleeve 37 and suction ports 39 of the fuel pump 5, so that the suction ports 39 are not blocked by the static dissipation sleeve 37.

The static dissipation sleeve 37 further includes a bendable contact 40 which acts as a static dissipation contact for the fuel pump 5. The stand-off bump 38 also may provide a static dissipation contact for the fuel filter assembly 1. Additionally, the bendable contact 40 may be used to remove the static dissipation sleeve 37 from the fuel filter assembly 1 by grasping the bendable contact 40 with pliers, for example, and pulling the static dissipation sleeve 37 off of the fuel pump 5 and out of the fuel filter assembly 1.

The above-described static dissipation sleeves provide improved static dissipation in fuel filters and allow for the static dissipation element to be slid onto and off of the fuel pump.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A fuel filter assembly comprising:
a housing;
a fuel pump;
a filter element assembly disposed outside of the fuel pump and including a filter medium for filtering fuel;
a static dissipation sleeve disposed outside of the fuel pump and in contact with an outer surface of the fuel pump; and
a water separation tube disposed between the static dissipation sleeve and the filter medium;
wherein the static dissipation sleeve includes a plurality of protrusion portions defining annular rings around a periphery of the static dissipation sleeve that project radially outward and contact the water separation tube; and
wherein the annular rings are located at a central portion of the static dissipation sleeve and at both axial ends of the static dissipation sleeve.

2. The fuel filter assembly of claim 1, wherein the water separation tube includes pull-off barbs at both ends thereof, the pull-off barbs projecting radially inward for limiting movement of the static dissipation sleeve.

3. The fuel filter assembly of claim 1, wherein the static dissipation sleeve is disposed around a central portion of the fuel pump.

4. The fuel filter assembly of claim 1, wherein the static dissipation sleeve further includes a plurality of contact points that project radially inward.

5. The fuel filter assembly of claim 4, wherein three of said contact points are distributed about a circumferential interior of the static dissipation sleeve.

6. The fuel filter assembly of claim 4, wherein the contact points are defined by discrete, circumferentially separated projections.

7. The fuel filter assembly of claim 4, wherein the contact points include an annular ring disposed about a circumferential interior of the static dissipation sleeve.

8. A static dissipater for a fuel filter assembly, comprising:
a static dissipation sleeve having a cylindrical main body; and
a plurality of protrusion portions defining annular rings around a periphery of the static dissipation sleeve and that project radially outward from the static dissipation sleeve, providing a static dissipation contact for the fuel filter assembly;
wherein the annular rings are located at a central portion of the static dissipation sleeve and at both axial ends of the static dissipation sleeve.

9. The static dissipater of claim 8, wherein the static dissipation sleeve further includes a plurality of contact points that project radially inward.

10. The static dissipater of claim 9, wherein three of said contact points are distributed about a circumferential interior of the static dissipation sleeve.

11. The static dissipater of claim 9, wherein the contact points are defined by discrete, circumferentially separated projections.

12. The static dissipater of claim 9, wherein the contact points include an annular ring disposed about a circumferential interior of the static dissipation sleeve.

\* \* \* \* \*